United States Patent Office 2,775,181
Patented Dec. 25, 1956

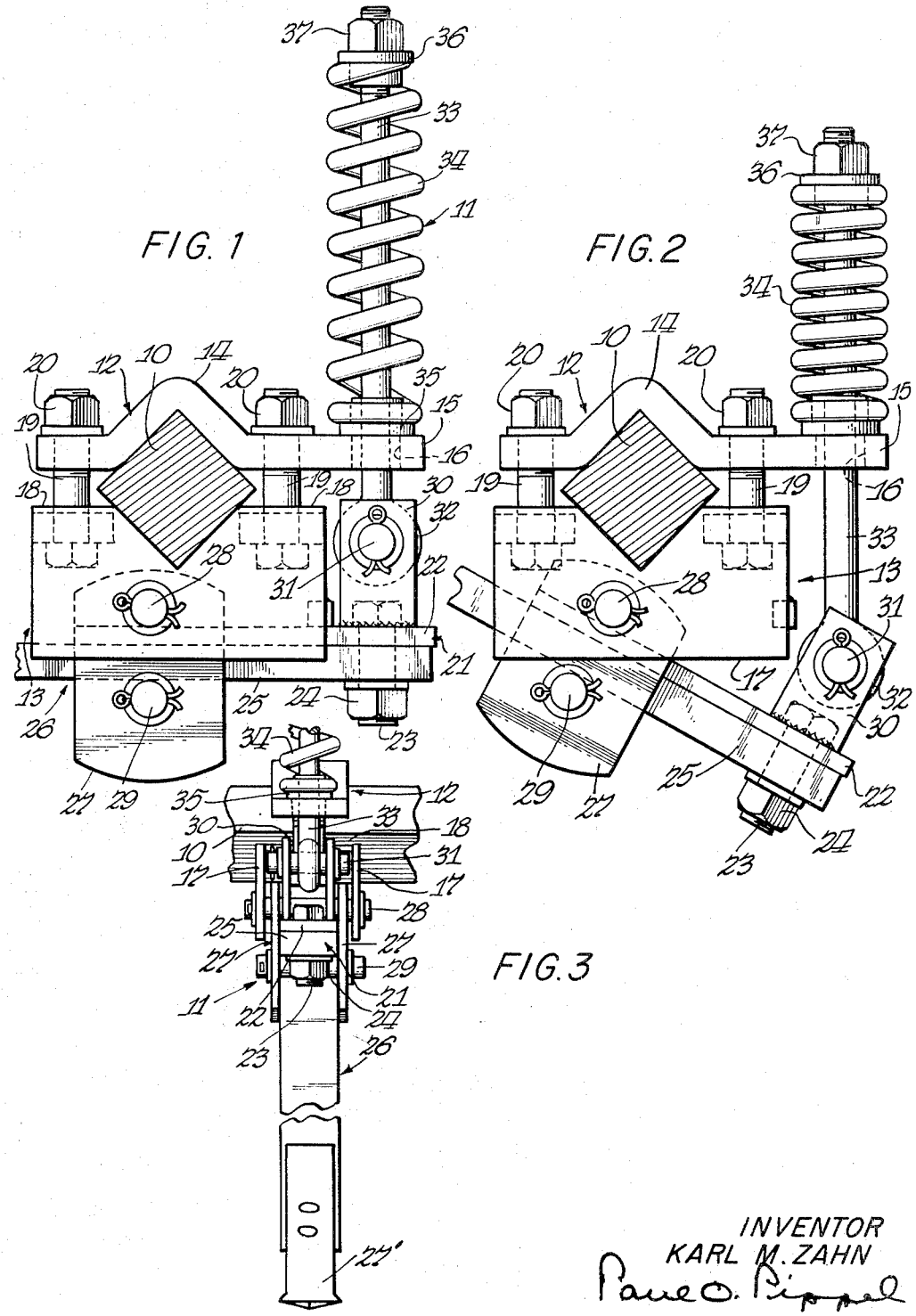

2,775,181

SPRING MOUNTED TOOL SHANK

Karl Martin Zahn, Stockton, Calif., assignor to International Harvester Company, a corporation of New Jersey Application August 17, 1953, Serial No. 374,732

2 Claims. (Cl. 97—47.84)

This invention relates to agricultural implements and particularly to tillage tools. More specifically the invention concerns an improved means for mounting an earth-penetrating tool upon a supporting frame. The invention will be described in its application to an implement of the type of a field cultivator, wherein a wheeled supporting frame is provided with a plurality of cultivator teeth mounted upon shanks affixed to the carrying frame. Some flexibility is desirable in the earth-penetrating tools of an implement of this type in order to secure a vibrating action of the cultivator teeth in the ground, resulting in improved tillage of the soil.

The object of the present invention is the provision of improved means for mounting earth-penetrating tools upon an implement frame.

Another object of the invention is the provision of an improved spring mounting mechanism for attaching a cultivator shank to a supporting frame, resulting in a vibratory action of the tools in the ground as the implement is propelled over a field to be tilled.

A further object of the invention is the provision of improved clamping means for securing a tool shank to a supporting frame of the square tool bar type.

Other objects and advantages of the invention will become clear from the following detailed description when read in conjunction with the accompanying drawings, wherein:

Figure 1 is a view in side elevation of a clamping structure embodying the features of this invention for securing the shank of a tillage tool to a carrying frame of the square tool bar type, the latter being shown in section;

Figure 2 is a view similar to Figure 1 showing the action of the tool shank by virtue of the flexible connection thereof to the carrying frame; and Figure 3 is an end elevation of the clamping mechanism of this invention.

Referring to the drawings, it will be observed that the numeral 10 designates a square tool bar forming part of a tool-carrying frame of the type adapted to be propelled over the ground by a tractor or other source of power and extending transversely of the direction of travel. It may be understood that the carrying frame 10, in the form of a square tool bar, is elongated and mounted upon supporting wheels, not shown, and that a plurality of clamping structures generally designated by the numeral 11 are mounted at spaced locations thereon.

The clamping structure 11 with which this invention is concerned comprises an upper clamping element 12 and a lower clamping element 13. The element 12 is provided with a V-shaped notch portion 14 adapted to receive and engage adjacent faces of the square tool bar 10, and an extension 15 is provided with an aperture 16 serving a purpose which will hereafter become clear.

The lower clamping member 13 is channel-shaped, comprising laterally spaced depending plates 17 connected by transverse strips 18 forwardly and rearwardly of the tool bar 19, and V-notches are provided in each of the plates 17 to receive the opposite adjacent faces of the tool bar 10. Each of the transverse braces 18 connecting the plates 17 is apertured to receive the shank of a bolt 19 extending upwardly through registering apertures provided in the clamping element 12 and threaded to receive a nut 20 by which the elements 12 and 13 are secured together.

Also forming a part of the clamping structure 11 is a rockable member 21 comprising a horizontal plate member 22, rectangular in section, adapted to be received between the plates 17 of the lower clamping element 13 and to extend forwardly therefrom parallel to and below the extension 15 of the upper clamping element 12. Member 22 is secured by a bolt 23 and a nut 24 to the forward end of the horizontal portion 25 of a tool shank 26, which extends rearwardly and curves downwardly and forwardly and has secured to its lower end an earth-penetrating tool 27'. The tool shank 26 is preferably of such a shape and thickness as to be somewhat flexible.

Part 22 of the rockable member 21 has secured thereto by welding and depending therefrom laterally spaced lugs 27 having an upwardly extending portion apertured to receive a transversely extending pivot pin 28 mounted in openings provided in the spaced arms 17 of the lower clamping element 13. The pivot pin 28 is engageable with the upper surface of the member 22. Likewise mounted in openings provided in the depending portion of the lugs 27 is another transverse pin 29 engageable with the lower face of the horizontal portion 25 of the tool shank. At this point it should be clear that the rockable member 21 and the tool-carrying shank 26 are pivotable about the axis of the pin 28.

At the forward end of the member 22 a pair of laterally spaced ears 30 are welded to and extend upwardly therefrom. These ears are provided with openings to receive a transverse pivot pin 31 upon which is mounted the eye 32 of a bolt 33, the shank of which extends upwardly through the opening 16 in the extension 15 of the upper clamping element, and the portion of the bolt thereabove is surrounded by a spring 34, the lower end of which engages a collar 35 which abuts the extension 15, and the upper end engages another collar 36. Tension on the spring 34 is adjustably maintained by a nut 37 on the threaded upper end of the shank 33 of the eyebolt. It should now be clear that the pivotal movement of the rockable member 21 and the tool shank 26 about the axis of the pin 38 is resisted by the spring 34, the compressed position of the spring being shown in Figure 2. The opening 16 in the extension 15 is larger than the shank 33 of the eyebolt to accommodate free movement of the bolt therein. The yielding resistance of the spring 34 results in a beneficial vibratory action of the tool-carrying shank 26 in the ground and also permits the pivoting of the tool shank to avoid obstructions in operation.

The novel tool clamping structure of this invention should be clearly understood from the foregoing description. It should likewise be understood that modifications may be made in the invention without departing from the spirit thereof or the scope of the appended claims.

What is claimed is:

1. In an agricultural implement including a transverse frame and an earth-working tool having a lower earth-penetrating portion and an upper horizontal shank portion, means for mounting the tool on the frame comprising a clamp secured to the frame and having a portion depending therefrom, a transverse pivot pin carried by said depending portion, a rockable member including laterally spaced lugs affixed thereto depending therefrom and pivotally mounted on said pin and straddling the shank and a horizontal portion between the shank and the clamp, another transverse pivot pin carried by said lugs engaging the lower surface of the shank and confining the latter therebetween and the first mentioned pin, means for connecting the rockable member to the shank forwardly of said pivot pins, a pair of ears on the rockable member projecting upwardly therefrom, a threaded rod pivotally mounted between said ears, said clamp having an opening to slidably receive said rod, a nut on the end of the rod, and a coil spring surrounding the rod between the clamp and the nut.

2. In an agricultural implement including a transverse tool bar rectangular in section and an earth-working tool extending rearwardly and downwardly having an earth-penetrating portion at its lower end and a shank for attachment to the tool bar, means for mounting the tool on the tool bar comprising clamping mechanism having upper and lower portions provided with V-shaped notches to engage angularly related opposite faces of the tool bar, bolt means connecting said clamp portions, the lower portion of the clamp including laterally spaced parts, a transverse pivot pin mounted in said parts, a rockable member comprising a pair of laterally spaced lugs affixed to said member and mounted on said pivot pin adapted to straddle said shank and a part extending forwardly from said lug above and parallel to the shank, means for releasably securing the shank to said member, another transverse pivot pin carried tby the lugs engageable with the under surface of said shank and independently of said clamp parts whereby said lugs are rockable about the axis of the first mentioned pivot pin, said shank being confined between said pins to accommodate rocking of the tool with said rockable member about a transverse axis, and spring means operatively connected to said clamping mechanism and to said shank at a location spaced from said axis.

References Cited in the file of this patent
UNITED STATES PATENTS

| | | |
|---|---|---|
| 2,125,512 | Martins | Aug. 2, 1938 |
| 2,627,798 | Graham | Feb. 10, 1953 |
| 2,674,172 | Graham | Apr. 6, 1954 |

FOREIGN PATENTS

| | | |
|---|---|---|
| 57,391 | Denmark | Mar. 18, 1940 |